March 16, 1926.
C. HAMMER
TWO-THREAD GLASS CONTAINER
Filed July 7, 1923
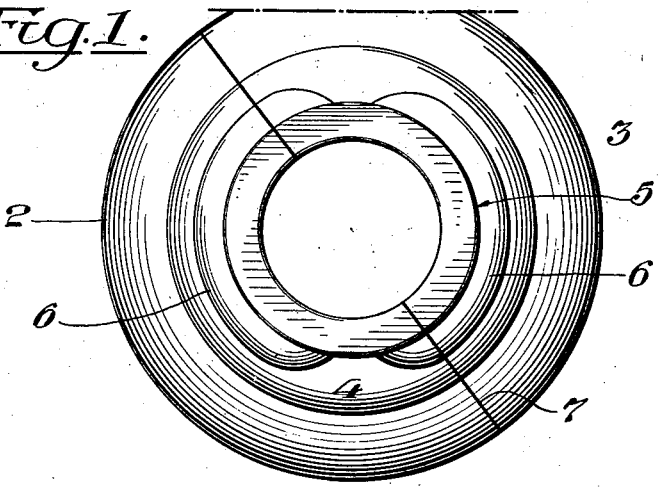
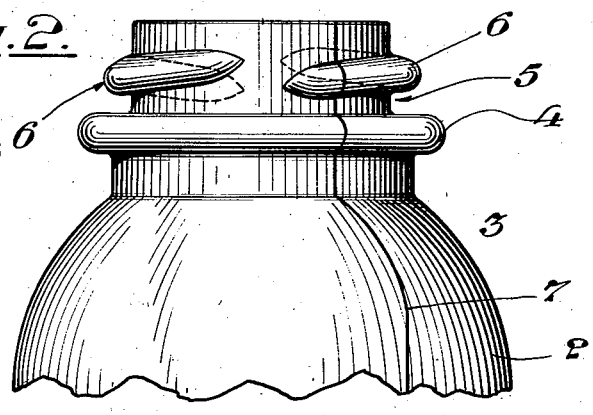
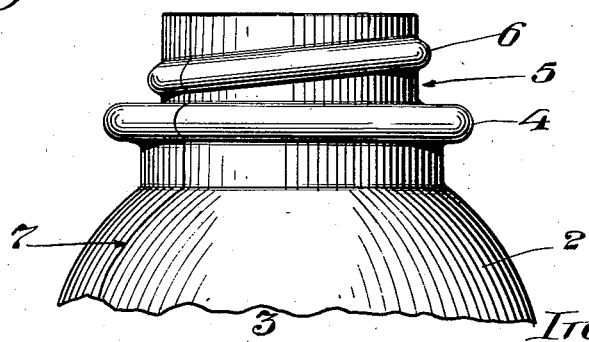
Inventor
Charles Hammer
by his Attorneys Patented Mar. 16, 1926.

1,577,020

UNITED STATES PATENT OFFICE.

CHARLES HAMMER, OF HOLLIS COURT BOULEVARD, NEW YORK.

TWO-THREAD GLASS CONTAINER.

Application filed July 7, 1923. Serial No. 650,114.

*To all whom it may concern:*

Be it known that I, CHARLES HAMMER, a citizen of the United States, residing at Hollis Court Boulevard, in the county of Queens and State of New York, have invented certain new and useful Improvements in Two-Thread Glass Containers, of which the following is a specification.

This invention relates to containers, particularly to glass containers, and especially to the threaded portions thereof, and which are particularly adapted for use with metal caps or closures, an object of the invention being to provide a glass container, such as a jar or bottle of such construction that it may be released from the metal molds easily and without any mutilation or tearing of the threads.

As is well known to glass manufacturers, great difficulty is experienced in releasing the glass containers from the metal molds without tearing portions of the threads owing to the fact that as the glass threads are inclined toward the shoulder of the container they form a wedge-shaped space of small dimensions near the shoulder, and as the two halves of the molds are hinged together so as to open in a horizontal plane, the neck rings of the molds not only have to be very thin at this narrow point between the thread and the shoulder in order to enter therein, and therefore quickly burn out, but on the opening of the molds in a straight line against the tapered under edge of the thread the glass threads, which are in a highly heated and therefore plastic condition, are mutilated and torn.

I have discovered however, that by providing a container with two threads of proper pitch, that the release of the container from the mold is very much facilitated and with much less likelihood of mutilation and tearing of the threads.

I believe that I am the first to provide a two-thread glass container, for such to my knowledge has never been manufactured heretofore by glass manufacturers.

Experience has shown that in the manufacture, for instance, of a three-thread glass container, the seams of the container formed by the contacting faces of the two halves of the mold necessarily crosses one of the threads substantially midway of the length of one of the threads, and this seam forming a slight projection, interferes with the rotation of the cap on to the container, but by forming a two-thread container the lower end of each thread may be so located with relation to the seam of the container that instead of the seam acting to interfere with the proper rotation of the cap on to the jar, it can act as a stop to prevent the rotation of the cap too far on to the jar and prevent its being turned off by a too strenuous application of the cap.

One of the objects of the present improvement therefore is the provision of a two-thread glass container in which the threads are so located as to facilitate the removal of the glass container from the mold.

And another, the provision of a two-thread glass container in which the threads are so located with relation to the seam of the container that the seam will act as a stop to prevent the turning off of the cap from the container.

In the drawings accompanying and forming a part of this specification, Fig. 1 is a top view of one form of glass container having the present improvement; Fig. 2 is a side view of Fig. 1; and Fig. 3 is a side view taken from a different point, all the figures being on an enlarged scale and considerably larger than the actual container from which the drawings were made.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The container 2 may be of any suitable shape, form or construction and of any suitable vitreous material, but is usually made of glass and comprises a body 3 having the usual shoulder 4 and neck 5 on which is located a pair of threads 6, thus forming divided threads, shown with the ends non-overlapping or spaced apart. These threads are so located that the inner end of each thread crosses at a predetermined point a seam of the jar. In other words, the seam 7 passes through each thread adjacent to the inner or lower end thereof and these threads have an easy, shallow angle of helix whereby each thread may have a pitch of more than three threads per inch and in the preferred form of container are so formed as to have a pitch of five to the inch, in consequence of which the inclination or taper of the thread is so gradual that the lower inner end of the thread is spaced sufficiently from the shoulder and is practically parallel therewith to enable the jar mold to be released easily and quickly and without mutilation or tearing of the thread, and as the slight projection of the seam as it crosses the thread at the inner lower end thereof forms a stop, it follows that it will act to prevent the cap from being turned off should it be applied too forcibly. From the foregoing it will be observed that the underside of the lower end of the thread at one side of and in front of the seam of the glass container is substantially parallel with the shoulder and that the inclination of the thread commences practically at the opposite side of the seam, so that at the juncture of said parallel portion and said inclined portion a stop face is formed.

In some forms of containers a greater number of threads may be used provided they have the pitch described herein.

It is possible to locate the threads somewhat differently than five to the inch, but experiments have determined that this is the preferable location or pitch of the threads to give the best results.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A seamed glass container having a shoulder and provided with a thread crossing the seam of the container, the lower end of the thread at its underside from the seam running parallel with the shoulder and at the opposite side of the seam having an angle of helix such that the thread will have a shallow, easy pitch, the seam of the container at the juncture of said parallel portion and pitched portion forming a stop face.

2. A seamed glass container having a shoulder and provided with a pair only of threads having non-overlapping endwise spaced ends crossing the seams of the container, the lower end of each thread at its under side from the seam of the container running parallel with the shoulder and at the opposite side of the seam having an angle of helix such that the thread will have a shallow, easy pitch, the seam of the container at the juncture of said parallel portion and pitched portion forming a stop face.

3. A seamed glass container having a shoulder and provided with a thread crossing the seam of the container, the lower end of the thread at its under side from the seam running parallel with the shoulder and at the opposite side of the seam having an upward pitch or inclination, the seam of the container at the juncture of said parallel portion and pitched portion forming a stop face.

4. A seamed glass container having a shoulder and provided with a pair only of threads having non-overlapping endwise spaced ends crossing the seams of the container, the lower end of each thread at its under side from the seam of the container running parallel with the shoulder and at the opposite side of the seam having an upward pitch or inclination, the seam of the container at the juncture of said parallel portion and pitched portion forming a stop face.

5. A seamed glass container having a shoulder and provided with a pair only of threads having non-overlapping endwise spaced ends crossing the seams of the container, the lower end of each thread at its under side from the seam of the container running parallel with the shoulder and at the opposite side of the seam having an angle of helix such that the thread will have a shallow, easy pitch of more than three threads per inch of height, the seam of the container at the juncture of said parallel portion and pitched portion forming a stop face.

Signed at Brooklyn, New York, this 5th day of July, 1923.

CHARLES HAMMER.